(12) United States Patent
Wicks

(10) Patent No.: US 10,077,041 B1
(45) Date of Patent: Sep. 18, 2018

(54) VARIABLE COMPRESSION RATIO ENGINE

(71) Applicant: Ford Global Technologies, LLC, Dearborn, MI (US)

(72) Inventor: Christopher Donald Wicks, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/464,097

(22) Filed: Mar. 20, 2017

(51) Int. Cl.
| | |
|---|---|
| *B60W 20/13* | (2016.01) |
| *F02D 13/02* | (2006.01) |
| *F02D 15/00* | (2006.01) |
| *F02D 21/08* | (2006.01) |
| *F02D 35/02* | (2006.01) |
| *F01D 15/10* | (2006.01) |
| *F02M 26/34* | (2016.01) |
| *F02P 5/15* | (2006.01) |
| *F02M 26/46* | (2016.01) |

(52) U.S. Cl.
CPC ............ *B60W 20/13* (2016.01); *F01D 15/10* (2013.01); *F02D 13/0276* (2013.01); *F02D 15/00* (2013.01); *F02D 21/08* (2013.01); *F02D 35/027* (2013.01); *F02M 26/34* (2016.02); *F02P 5/15* (2013.01); *B60W 2540/106* (2013.01); *F02M 26/46* (2016.02)

(58) Field of Classification Search
CPC ............ B60W 20/13; B60W 2540/106; F02M 26/43; F02M 26/46; F01D 15/10; F01D 13/0276; F01D 15/00; F01D 21/08; F01D 35/027; F02P 5/15

USPC .......................................................... 701/22
See application file for complete search history.

(56) References Cited

U.S. PATENT DOCUMENTS

| | | | |
|---|---|---|---|
| 4,326,145 A | 4/1982 | Foster et al. | |
| 5,101,776 A | 4/1992 | Ma | |
| 2006/0225693 A1* | 10/2006 | Brachert | ................. F02B 69/06 123/255 |
| 2015/0267625 A1* | 9/2015 | Kiyomura | ........... F02D 13/0226 123/48 AA |

FOREIGN PATENT DOCUMENTS

DE 3048928 A1 7/1982

\* cited by examiner

*Primary Examiner* — Marthe Y Marc-Coleman
(74) *Attorney, Agent, or Firm* — Julia Voutyras; McCoy Russell LLP

(57) ABSTRACT

Methods and systems are provided for a variable compression ratio engine. In one example, an engine system may comprise: varying a compression ratio of a cylinder by selectively releasing combustion charge from the cylinder through a bleed valve on a cylinder head; and transforming the released combustion charge into usable electrical power at a turbine generator coupled downstream of the bleed valve. In this way, the compression ratio may be varied based on engine operating conditions to promote better engine performance and efficiency while producing electrical power from the charge gas bled from one or more cylinders in the engine.

20 Claims, 7 Drawing Sheets

VARIABLE COMPRESSION RATIO ENGINE

FIELD

The present description relates generally to methods and systems for a variable compression ratio engine.

BACKGROUND/SUMMARY

An engine operating under varying engine load and speed conditions may be improved by varying engine compression ratio. For example, during low engine loads, the engine compression ratio may be increased to improve engine efficiency. During high engine loads, the compression ratio may be decreased to threshold levels that minimize occurrence of engine knock due to high temperature and pressure in combustion chambers in the engine. In this way, the engine may be adjusted to produce a variable compression ratio based on engine load, speed and other factors. By varying the compression ratio based on engine operating conditions, engine overall performance and efficiency may be improved.

Numerous approaches of adjusting the compression ratio in the engine may include altering geometry of the combustion chamber and modifying other engine accessories. One example approach is shown by Ma in U.S. Pat. No. 5,101,776. Therein, a variable compression ratio engine includes a combustion chamber connected to an auxiliary chamber via a flow passage having a poppet valve. In order to achieve low engine compression ratios, the poppet valve may be opened to allow flow of charge gas from the combustion chamber into the auxiliary chamber. Alternatively, high compression ratios in the engine may be realized by closing the poppet valve to isolate the auxiliary chamber from the main combustion chamber.

However, the inventors herein have recognized potential issues with such a system. For example, the energy contained in the charge gas bled from the main combustion chamber into the auxiliary chamber may not be adequately recovered during engine operation. Further, substantial modification to geometry of the combustion chamber, which may introduce additional manufacturing and assembly complexity, is required in the above design of the variable compression ratio engine.

In one example, the issues described above may be addressed by engine system may comprise: varying a compression ratio of a cylinder by selectively releasing combustion charge from a cylinder to a manifold via a bleed valve on a cylinder head; and transforming the released combustion charge into usable electrical power at a turbine generator coupled downstream of the bleed valve. The manifold may be configured with an internal passage that diverts combustion charge gas from the cylinder into the turbine generator when both the bleed and check valves are adjusted to open valve positions.

By adjusting the flow of combustion charge gas from the cylinder into the manifold, engine compression ratio may be varied based on engine operating conditions while producing electrical energy from the charge gas bled from one or more cylinders. In this way, the engine compression ratio may be varied without altering geometry of any of the cylinders and while promoting better engine performance under a wide range of engine speeds and loads.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-5 are shown approximately to scale, although other relative dimensions may be used, if desired.

DETAILED DESCRIPTION

Figure 1:
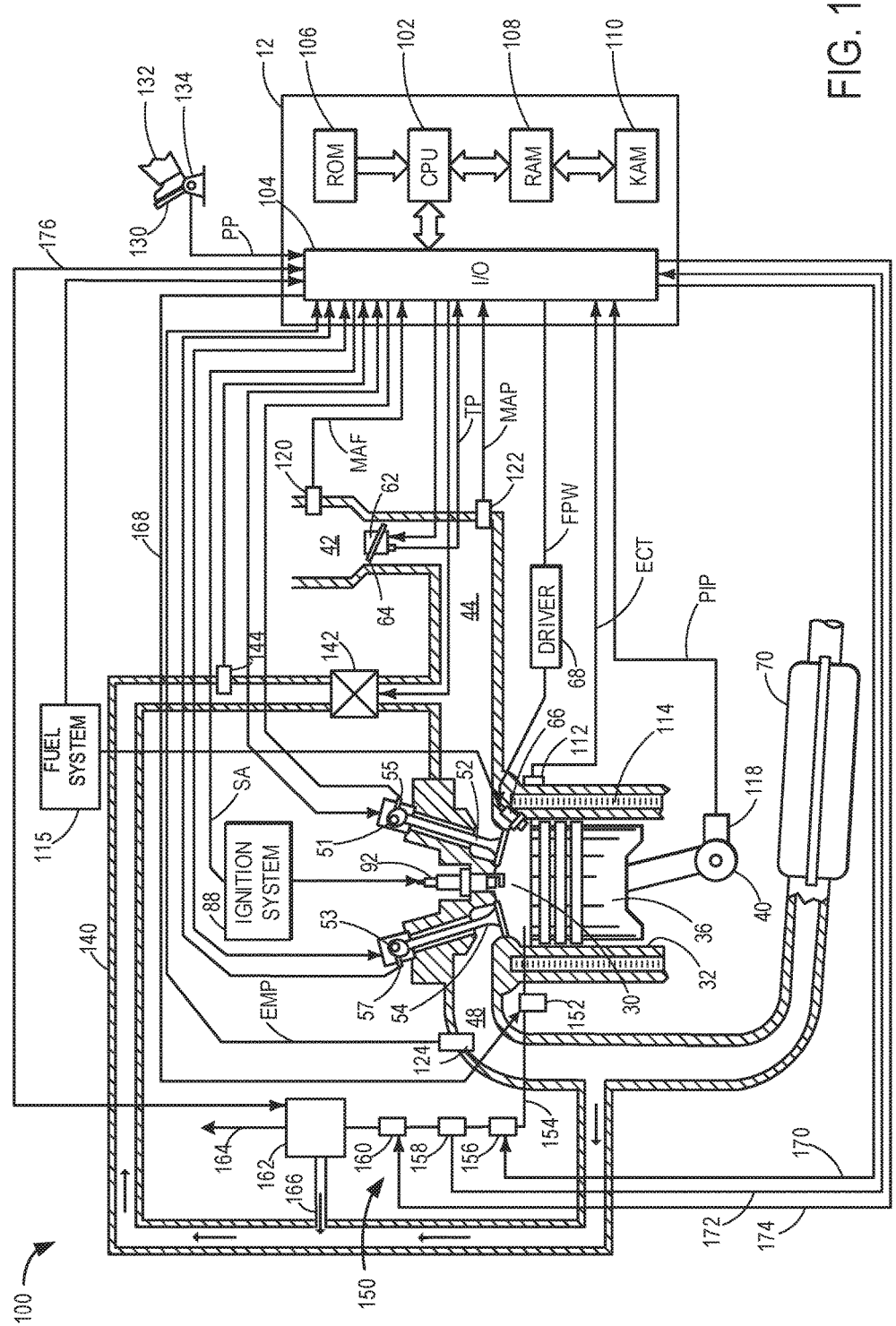
FIG. 1 shows a schematic depiction of an example engine system.
Figure 2:
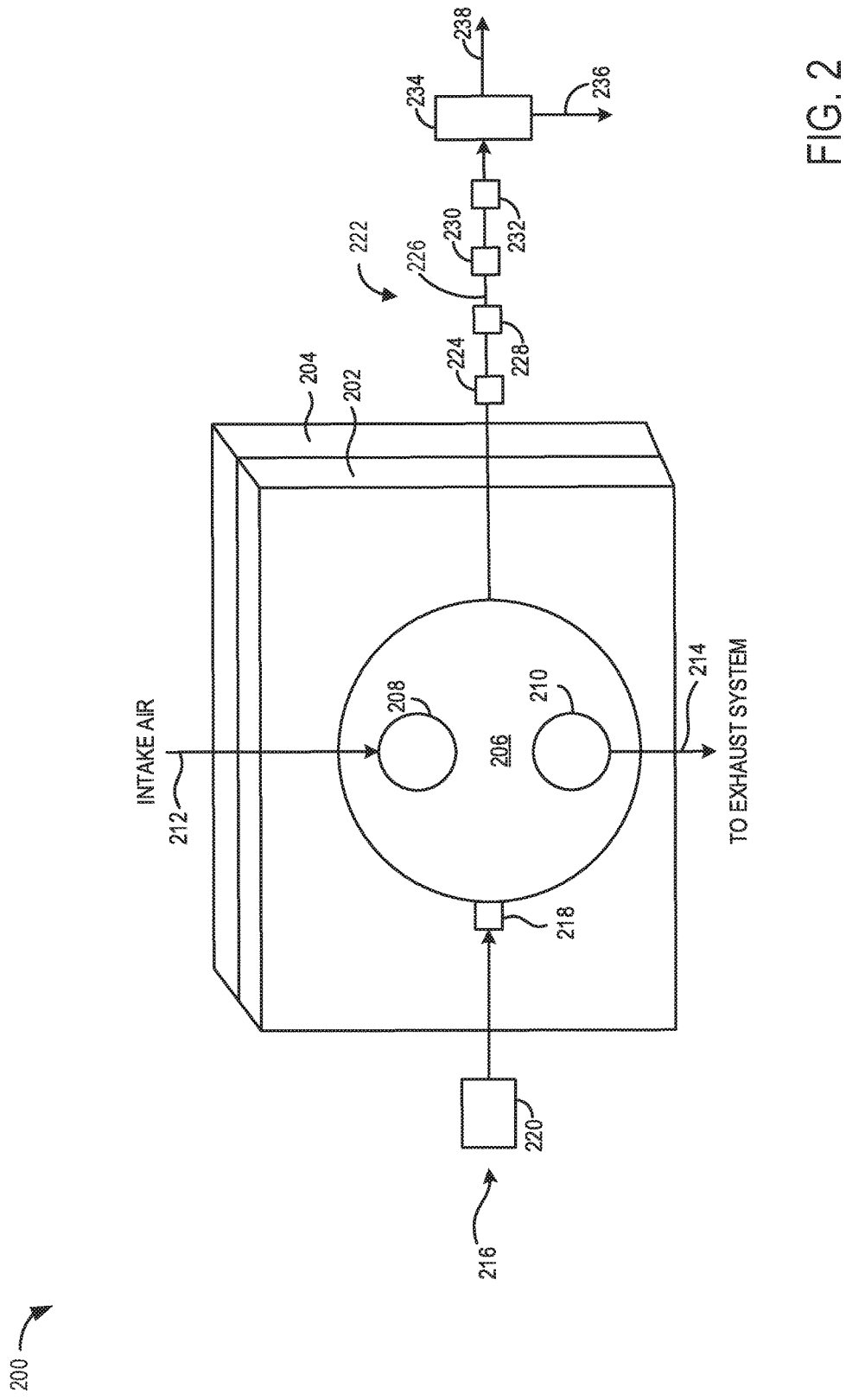
FIG. 2 shows a schematic depiction of an engine system comprising a cylinder head mounted to a cylinder block.
Figure 3:
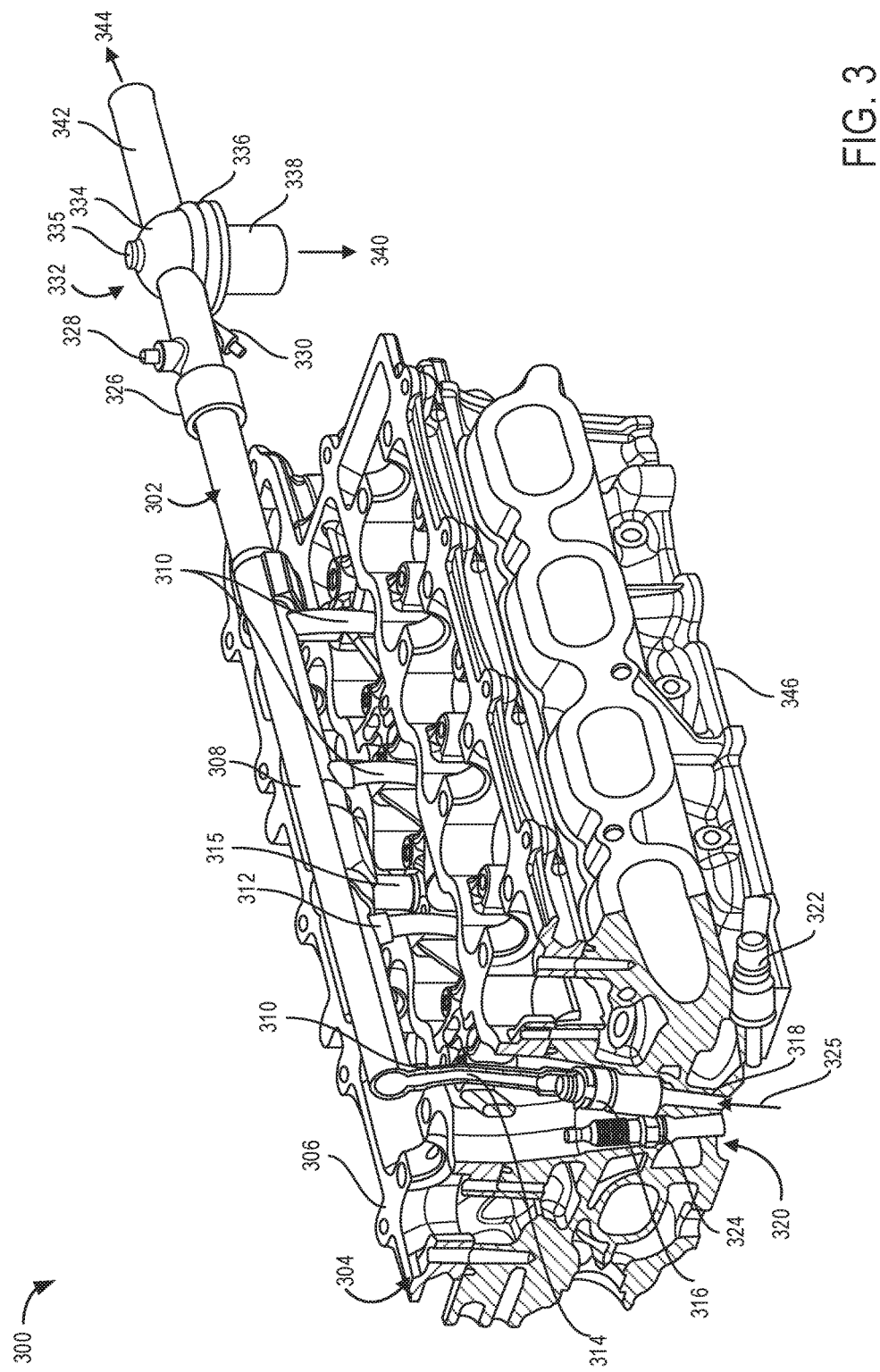
FIG. 3 shows a schematic depiction of a manifold system attached to a cylinder head to divert combustion charge gas from one or more cylinders to a turbine-generator.
Figure 4:
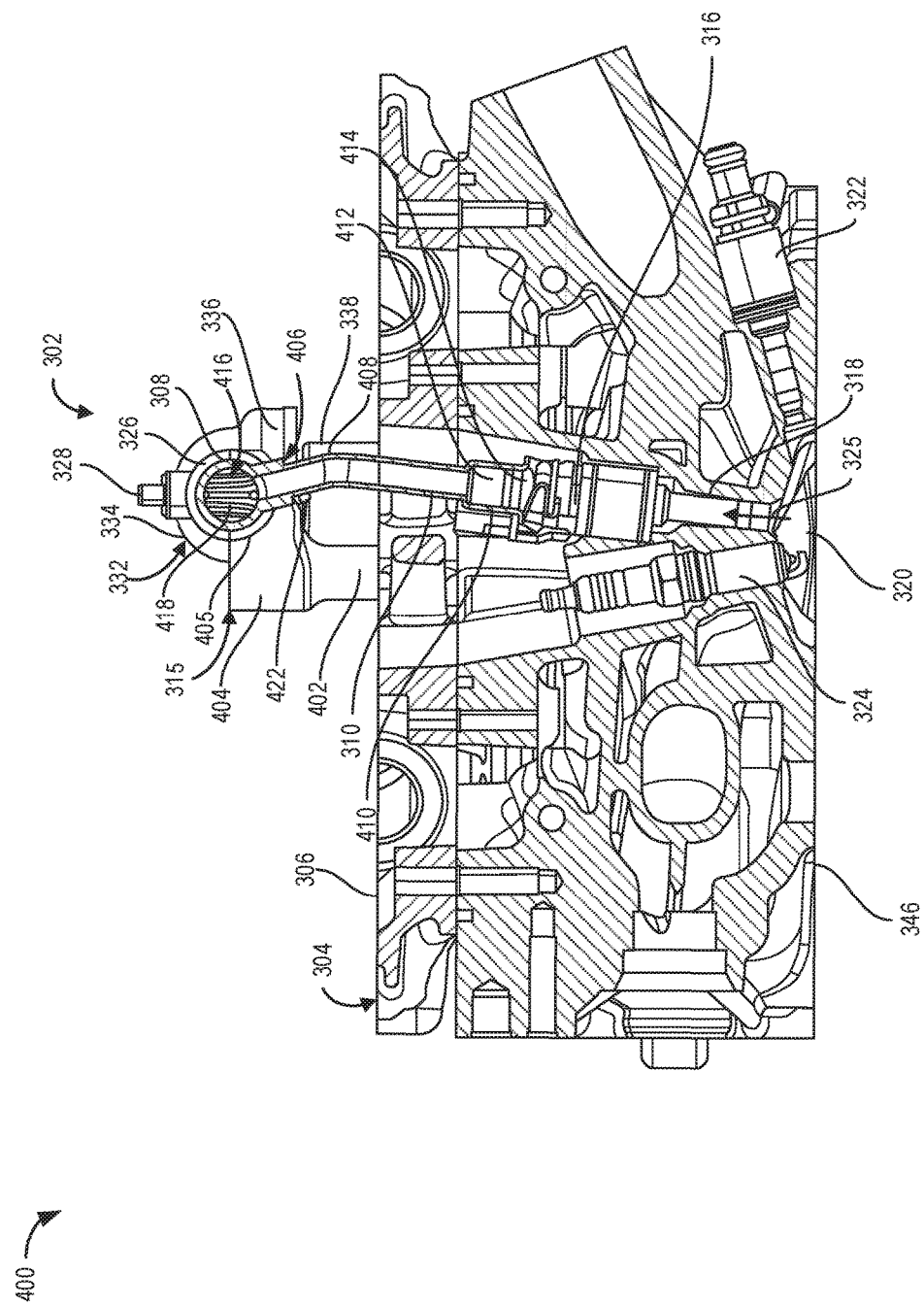
FIG. 4 shows a front sectional view of the manifold system attached to the cylinder head to divert combustion charge gas from one or more combustion chambers to the turbine generator.
Figure 5:
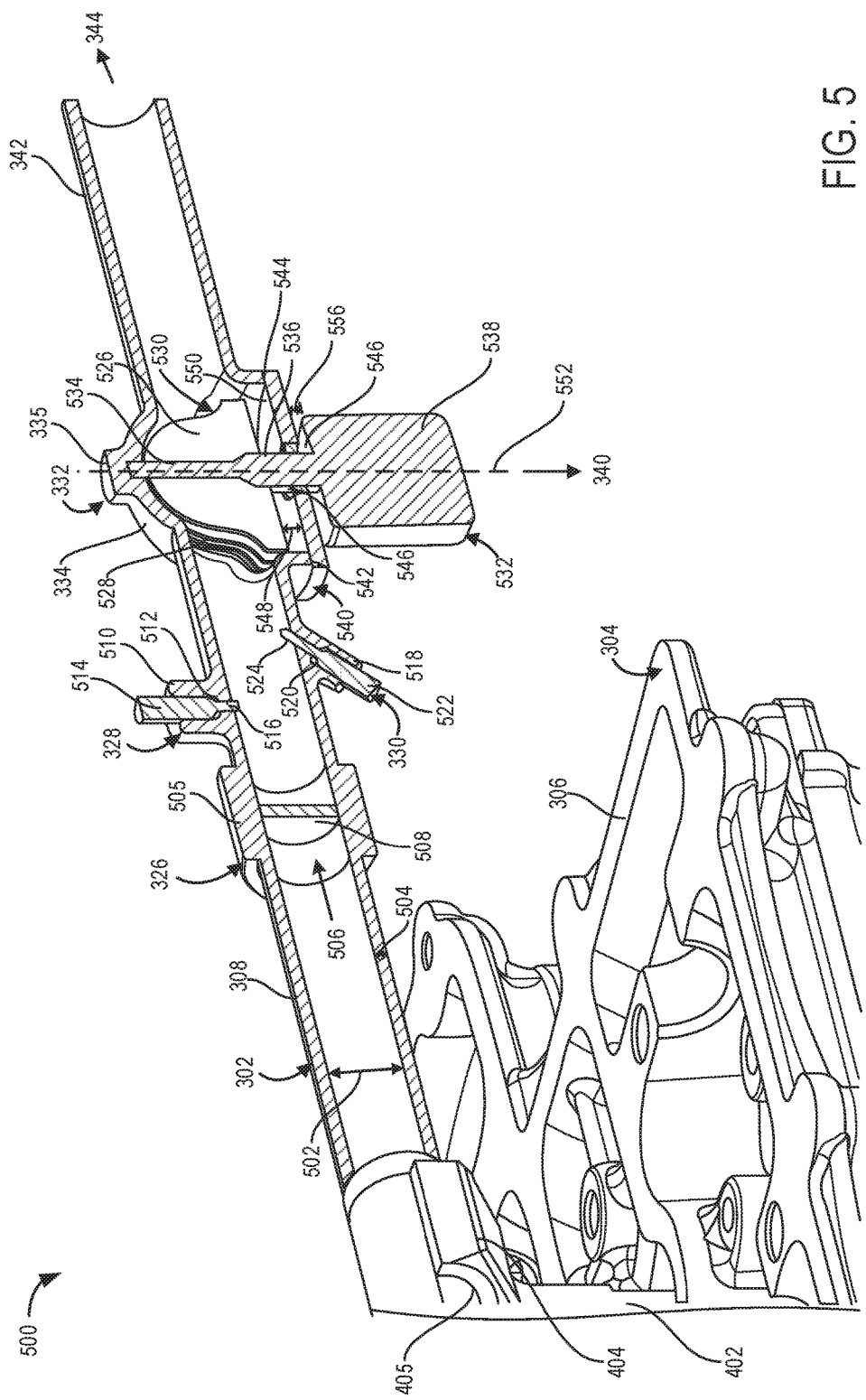
FIG. 5 shows a cross sectional view of the manifold system attached to the cylinder head.

The following description relates to systems and methods for a variable compression ratio engine. FIG. 1 shows an engine system having a control valve that may be adjusted to vary compression ratio in the engine by bleeding combustion charge gas from a combustion chamber to a manifold system coupled to a turbine-generator. The control valve may be adjusted by an engine controller based on engine operating conditions to vary the compression ratio in the engine. The cylinder may be mounted to a cylinder block coupled to a cylinder head, as shown in FIG. 2. Air introduced into the combustion chamber, may be mixed with injected fuel to form an air-fuel mixture which is combusted to produce engine power. The manifold system coupled to the cylinder head, may include a manifold configured with an internal passage that conveys the combustion charge gas bled from the combustion chamber to the turbine-generator, as shown in FIGS. 3-5. A serviceable check valve/particulate filter coupled to the manifold, ensures cleanliness of the system and prevents back flow of charge gas or any unwanted upstream reversion. Further, a gas sensor coupled to the manifold at a downstream position from the check valve, is designed to detect presence of unburned fuel in the combustion charge gas prior to entry into the turbine-generator. If any unburned fuel is detected in the charge gas in the manifold, an igniter coupled to the manifold may be adjusted by the engine controller to combust the unburned fuel before the charge gas flows into the turbine-generator. Upon entry into the turbine-generator, the charge gas turns a turbine wheel to produce electrical power which may be distributed to power demand centers in the engine. Any exhaust gas produced in the manifold system may be diverted to an exhaust gas recirculation system, where the exhaust gas is diverted to the air intake manifold.

Figure 6:
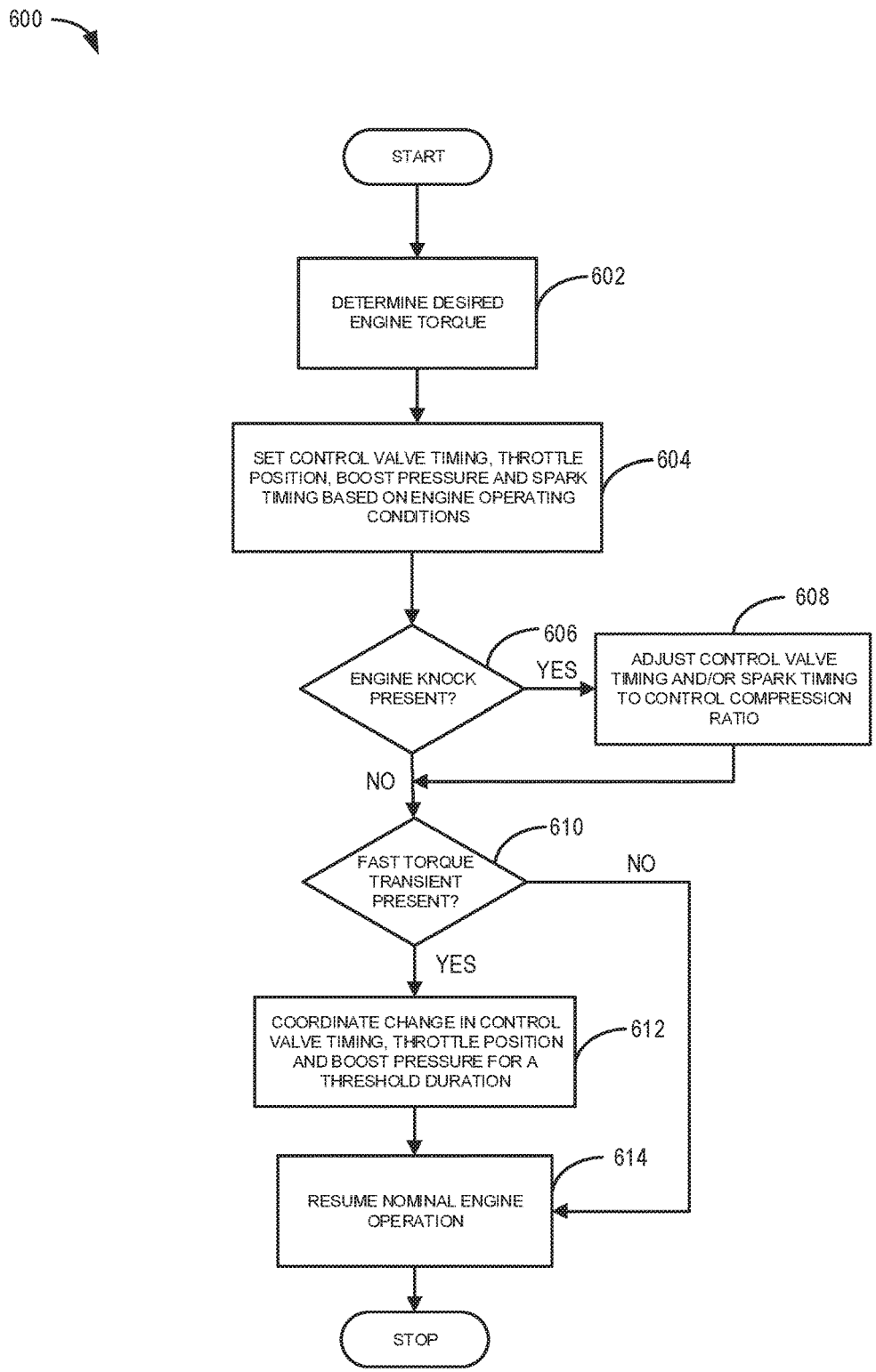
FIG. 6 shows a method for adjusting compression ratio in the engine to produce desired engine torque.
Figure 7:
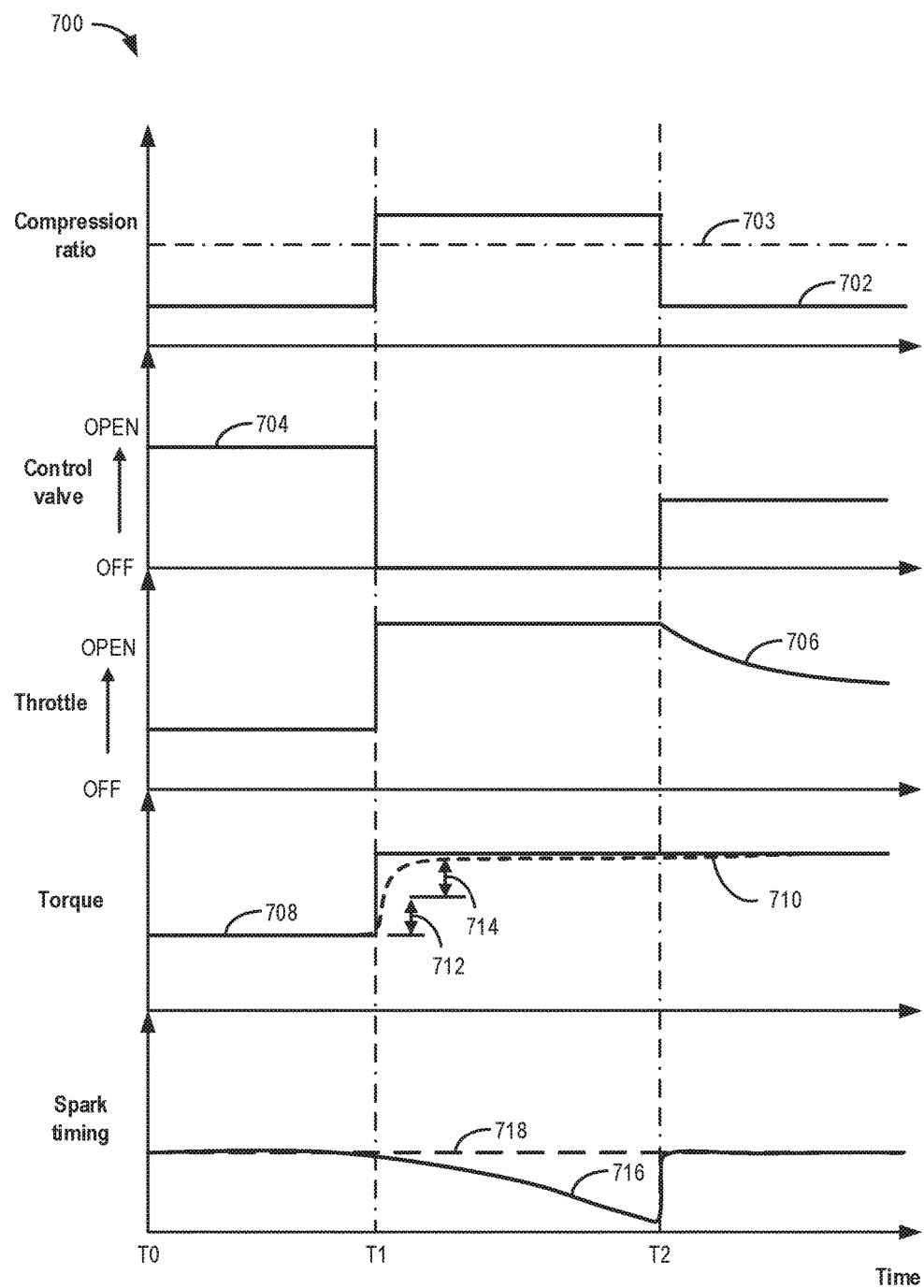
FIG. 7 shows a graphical out of compression ratio and engine torque based on changes in control valve position, throttle position and spark timing.

An example method for adjusting the compression ratio in the engine having the control valve coupled to the combustion chamber and the manifold connected to the turbine-generator is shown in FIG. 6. The compression ratio may be varied by adjusting a control valve timing, throttle position and spark timing. When adjusted to the open valve position, a portion of the combustion charge gas in the combustion chamber may be diverted into the manifold to decrease the engine compression ratio. The bled charge gas in the manifold may be flowed further to the turbine-generator to produce electrical power. Alternatively, the compression ratio may be varied by adjusting the throttle position and/or spark timing, as disclosed in FIG. 6. The control valve timing, throttle position and/or spark timing may be adjusted to produce an example graphic output of compression ratio and engine torque, as shown in FIG. 7. The engine compression ratio may be varied by adjusting one or more of the control valve timing, throttle position and spark timing to keep the engine torque close to a desired engine torque. The combustion charge gas bled from the combustion chamber when the control valve and check valve are adjusted to open valve positions, may be diverted into the turbine-generator to produce electrical power to operate engine components and other vehicle systems. In this way, the engine compression ratio may be varied to improve engine performance while producing electrical power that may be distributed to power demand centers in the engine.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

The combustion chamber 30 may be fueled via a fuel injector 66 supplied with fuel from fuel system 115. Ignition system 88 can provide an ignition spark an air-fuel mixture in the combustion chamber 30 via spark plug 92 in response to spark advance signal SA from controller 12, under select operating modes. Though spark ignition components are shown, in some embodiments, combustion chamber 30 or one or more other combustion chambers of engine 100 may be operated in a compression ignition mode, with or without an ignition spark. Upon ignition, the air-fuel mixture in the combustion chamber 30 may combust to produce a combustion charge gas that provides energy required for piston movement.

A manifold system 150 may be provided to vary compression ratio in the engine 100. The manifold system 150 may include a control valve 152, a manifold 154, a check valve 156, charge gas sensor 158, and an igniter 160. When the control valve 152 is adjusted to an open valve position, the combustion charge gas in the combustion chamber 30 may be diverted into the manifold 154 in order to vary the compression ratio in the cylinder. Timing and duration of opening and closing of the control valve 152 may be adjusted based on engine operating conditions, such as engine speed and load. When metered combustion charge gas flows through a section of the manifold 154 past check valve 156, the gas sensor 158 detects any unburned fuel in the charge gas prior to entry to a turbine-generator 162. If unburned fuel is detected in the combustion charge gas, the igniter 160 may be switched on by controller 12 to combust the unburned fuel before the charge gas is flowed to the turbine-generator 162. The igniter 160 may be turned off when all the unburned fuel in the combustion charge gas is forced downstream into the turbine-generator 162 past the check valve 156 located upstream of the turbine-generator, and prevents any reversion or gas flow back upstream toward the combustion chamber so as to focus all the primary and or secondary ignited combusted energy on the turbine wheel located within the turbine-generator 162. Upon entry into the turbine-generator 162, the combustion charge gas drives the turbine wheel to produce electrical energy which is directed to power demand centers, or to battery storage to be used on demand, as shown by arrow 164. The battery charge may be used to operate the vehicle or run a supercharger compressor coupled to an engine on the vehicle. Any residual exhaust gas in the turbine-generator 162 is diverted to the exhaust gas recirculation (EGR) system via an exhaust passage 166. As elaborated at FIGS. 3-5, controller 12 may be used to adjust the valve positions of the control valve 152 and check valve 156 by sending signals 168 and 170, respectively to each valve. The controller 12 may also be used to control the igniter 160. For example, controller 12 may send signal 174 to turn on the igniter upon receiving signal 172 from the gas sensor 158 indicating unburned fuel in the combustion charge gas in the manifold 154. Performance of the turbine generator 162 may be controlled via controller 12 based on engine operating conditions. For example, the turbine generator 162 may receive signal 176 from the controller 12 when amount of combustion charge gas delivered to the turbine generator changes based on changes in engine speed and load change.

A pressure sensor 124 may be coupled to exhaust passage 48 downstream of exhaust valve 54 and upstream of emission control device 70. Pressure sensor 124 is preferably positioned close to exhaust valve 54 to measure the exhaust manifold pressure (EMP). In one embodiment, pressure sensor may be a pressure transducer. The engine controller may infer cylinder torque imbalance based on the weighted output of the pressure sensor.

Emission control device 70 is shown arranged along exhaust passage 48 downstream of the pressure sensor 124. The emission control device 70 may be a three way catalyst (TWC), configured to reduce NOx and oxidize CO and unburnt hydrocarbons. In some embodiments, device 70 may be a NOx trap, various other emission control devices, or combinations thereof.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 100, in addition to those signals previously discussed, including measurement of inducted mass air flow (MAF) from mass air flow sensor 120; exhaust manifold pressure (EMP) from pressure sensor 124; engine coolant temperature (ECT) from temperature sensor 112 coupled to cooling sleeve 114; a profile ignition pickup signal (PIP) from Hall effect sensor 118 (or other type) coupled to crankshaft 40; a cylinder torque from the crankshaft torque sensor coupled to crankshaft 40; throttle position (TP) from a throttle position sensor; and absolute manifold pressure (MAP) signal from sensor 122. Engine speed signal, RPM, may be generated by controller 12 from signal PIP. Controller 12 also may employ the various actuators of FIG. 1 to adjust engine operation based on the received signals and instructions stored on a memory of the controller.

Storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Turning to FIG. 2, a schematic depiction of an engine 200 (such as engine 100 shown in FIG. 1) used to provide motive power to a vehicle, is shown. In the depicted example, the engine 200 includes a cylinder head 202 coupled to a cylinder block 204 forming a combustion chamber 206. The engine 200 is configured to implement combustion operation in the combustion chamber 206. An intake valve 208 is provided in the engine 200 to flow intake air into the cylinder 206 at selected time intervals. Correspondingly, an exhaust valve 210 is provided in the engine 200 to flow exhaust gas out of the combustion chamber 206 into a downstream exhaust system at selected time intervals. Although the engine 200 is depicted as having only a single cylinder, in other examples, the engine 200 may include more than one cylinder.

Arrow 212 represents the flow of intake air from upstream intake system components such as intake conduits, an intake manifold, a throttle, a compressor, etc., to the intake valve 208. On the other hand, arrow 214 represents the flow of exhaust gas to downstream components such as exhaust conduits, an exhaust manifold, emission control device(s), a turbine, etc., from the exhaust valve 210.

A fuel delivery system 216 is also provided in the engine 200. The fuel delivery system 216 is configured to provide fuel for combustion in the cylinder 206 at desired time intervals. The fuel delivery system 216 includes a direct injector 218, in the illustrated example, and upstream components 220. The upstream components 220, such as fuel pumps, valves, conduits, etc., are configured to provide fuel to the fuel injector 218. However, a port injector configured to deliver fuel into a conduit upstream of the cylinder may be additionally or alternatively included in the fuel delivery system 216. The engine 200 is configured to implement a four stroke combustion cycle in the engine. The combustion strokes include an intake stoke, a compression stroke, a combustion stroke, and an exhaust stroke, described in greater detail herein. An ignition device (not shown) may also be provided in the engine 200. The ignition device may be configured to provide spark to the cylinder 206 at selected time intervals. However, in other examples the ignition device may be omitted from the engine and the engine may be configured to perform compression ignition, or two cycle engine.

A manifold system 222 (such as manifold system 150 shown in FIG. 1) may be provided to receive combustion charge from one or more cylinders, thereby allowing compression ratio in engine 200 to be varied. The manifold system 222 may include a control valve 224, manifold 226, check valve 228, charge gas sensor 230, and igniter 232. When the control valve 224 is adjusted to an open valve position, combustion charge gas in the combustion chamber 206 may be diverted into the manifold 226 in order to adjust engine compression ratio. Timing and duration of opening and closing of the control valve 224 may be adjusted based on engine operating conditions, such as engine speed and load. When the check valve 228 is adjusted to an open valve position, the combustion charge gas flows through a section of the manifold 226 adjacent to the gas sensor 230 which detects any unburned fuel in the charge gas prior to entry to a turbine-generator 234 positioned downstream of the gas sensor. If unburned fuel is detected in the combustion charge gas, the igniter 232 is turned on to combust the unburned fuel before the charge gas flows into the turbine-generator 234. The igniter 232 may be turned off when all the unburned fuel in the combustion charge gas has been forced through the turbine-generator 234, the check valve 228 remains closed during this secondary combustion event to ensure no unwanted reversion back upstream of the turbine-generator. Upon entry into the turbine-generator 234, the combustion charge gas turns a turbine wheel (not shown) to produce electrical energy which is distributed to power demand centers, as shown by arrow 236. Any residual exhaust gas in the turbine generator 234 is diverted to an EGR system via an exhaust passage 238.

Referring to FIG. 3, a schematic view 300 of a manifold system 302 attached to a cylinder head 304 of an engine (such as engine 100 shown in FIG. 1) to divert combustion charge gas from a plurality of cylinders 320 to an electric turbine-generator 332, is disclosed. The manifold system 302 comprises a manifold 308, a control valve 316, check valve/filter 326, a charge gas sensor 328 and an igniter 330. The check valve/filter 326 may be a serviceable particulate filter and valve combination system, which controls flow of charge gas from manifold 308 into the turbine-generator 332 while filtering charge gas flowing through the manifold. The manifold system 302 may be mounted to an adjacent engine component such as a cam carrier, cam cover or secured to an outer face 306 of the cylinder head 304. In this example, the manifold system 302 may be mounted to a manifold mounting boss 315. An inner face 346 of the cylinder head 304 may be attached to a cylinder block (not shown) containing the plurality of cylinders 320. The combustion charge gas from each combustion chamber 320 may be diverted to the turbine generator 332 via the manifold 308. The turbine generator 332 may include a top portion 334, a middle portion 336 and a lower portion 338. The top portion 334 may include a protruding cap 335 attached to conical housing. The middle portion 336 may include a plurality of circular rings that transition to the lower portion 338 which includes a cylindrical tube. The lower portion 338 may connect to engine components that draw electrical power, as shown by arrow 340. Further, the turbine-generator 332 may be coupled to an exhaust passage 342 leading to an exhaust gas recirculation (EGR) system, positioned in a direction shown by arrow 344.

During engine operation, fuel may be injected into each combustion chamber 320 via a fuel injector 322 mounted to a side portion of the cylinder head. The injected fuel may mix with air delivered to the cylinder to produce an air-fuel mixture that is ignited by a spark plug 324. The ignited air-fuel mixture combusts to produce combustion charge gas which produces energy for operating the engine. Depending on engine operating conditions, the combustion charge gas in each combustion chamber 320 may be bled into flow line 318 to adjust the engine compression ratio. The combustion charge gas enters the flow line 318, as shown by arrow 325. The control valve 316, may be selectively adjusted to control an amount of the combustion charge gas delivered to the manifold 308. In some embodiments, the control valve 316 may be described as a bleed valve. In this case, the bleed valve is distinct from an exhaust valve of the cylinder head assembly.

A plurality of flow lines 310 may be coupled to the manifold 308 via connectors 312, to allow flow of combustion charge gas from the combustion chamber 320 into the manifold, when the control valve 316 is adjusted to the open valve position. Each flow line 310 may be adequately sized with an internal flow passage 314, which delivers combustion charge gas from the combustion chamber 320 to the manifold 308. As an example, during low engine loads, the control valve 316 may remain closed during moderately high engine loads, and may be adjusted to a first position wherein a first amount of combustion charge gas is bled off from the combustion chamber 320 into the manifold 308, and compression of an air-fuel mixture in the cylinder produces a first compression ratio. In another example, during high engine load, the control valve 316 may be adjusted to a second position, wherein a second amount of combustion charge gas is bled off from the combustion chamber 320 into the manifold 308, and compression of an air-fuel mixture in the cylinder produces a second compression ratio, lower than the first compression ratio. Alternatively, a duration of valve opening of the control valve may be adjusted to vary the engine compression ratio. In this way, engine compression ratio may be adjusted by varying position of the control valve and/or duration of valve opening of the control valve. The check valve/filter 326 may be always open allowing positive flow downstream (to turbine generator) while resisting or denying any reversion upstream of charge gas into the combustion chamber. As the combustion charge gas in the manifold 308 flows downstream toward the turbine-generator 332, the gas sensor 328 mounted to the manifold at a downstream position from the check valve/filter 326, may detect unburned fuel in the combustion charge gas. If any unburned fuel is detected in the manifold 308, the engine controller (such as controller 12, shown in FIG. 1) may turn on the igniter 330 to combust the unburned fuel in the combustion charge gas, before the charge gas flows into turbine-generator 332. The charge gas entering the turbine-generator 332, drives a turbine wheel to generate electrical power, which is transmitted to power demand centers of the engine as shown by direction arrow 340. As an example, the electrical power generated by the turbine-generator 332 may be supplied to electrically operated engine components or vehicle electrical systems. In another example, the electrical power generated by the turbine-generator may be stored as usable electrical power in a battery coupled to the turbine generator. Once, the combustion charge gas is converted into electrical power, any residual exhaust gas in the turbine generator 332 is diverted to the exhaust passage 342, where the exhaust gas is diverted to the EGR system, as shown by arrow 344.

Referring to FIG. 4, a front section view 400 of the manifold system 302 attached to the cylinder head 304 to divert combustion gas from each combustion chamber 320 to the turbine generator 332 is disclosed. The manifold system 302 may be mounted to the cylinder head 304 via the manifold mounting boss 315 secured to the outer face 306 of the cylinder head. As an example, the manifold mounting boss 315 may be secured to the cylinder head using a clamp or any other suitable means of mechanical assembly.

As shown in FIG. 4, the manifold mounting boss 315 may include a vertical column 402 that connects to a mounting pad 404 having a curved annular portion 405. The mounting pad 404 may be a horizontally extended arm that couples to an external portion of the manifold 308, for example. The manifold 308 may be fluidly coupled to the flow line 310 at a first end 406, which may be positioned above a curved junction 408 of the flow line. A second end 410 of the flow line 310 may include a seal cup 412 that may be adequately sized to receive an O-ring seal 414 of the control valve 316. When the control valve 316 is adjusted to an open valve position, combustion charge gas from the combustion chamber 320 may flow into the manifold 308. As an example, the degree of valve opening may be adjusted to allow for a variable flow of combustion charge gas from the combustion chamber 320 into the manifold system 302, thereby allowing engine compression ratio to vary based on engine operating conditions, such as engine speed and load. Further, the control valve 316 may be adjusted to a closed valve position to stop flow of combustion charge gas from the combustion chamber 320 into the manifold 308. By adjusting flow of combustion charge gas from the combustion chamber 320 into the manifold system 302, the engine compression ratio may be adjusted based on engine load-speed and other engine parameters.

The check valve/filter 326 may be coupled to the manifold 308, to control reverse flow of the combustion charge gas back or (upstream) into the combustion chamber. Check valve/filter 326 always allows combustion gas flow downstream into the turbine-generator 332. In this case, the manifold 308 is fluidly coupled to the turbine generator 332, thereby allowing combustion charge gas flow from the combustion chamber into the turbine-generator 332. The combustion charge gas entering the turbine-generator 332 drives a wheel 418, mounted inside an interior region 416 of the turbine-generator to produce electrical power, which is transmitted to power demand centers of the engine, as shown by direction arrow 340. As an example, the released combustion charge gas is transformed into usable electrical power which may be stored as usable electrical power in a battery coupled to the turbine generator. In a further example, the engine may be coupled in a hybrid vehicle which may be propelled using motor torque derived from an electrical motor driven by electrical power drawn from the battery. When the engine attains a designated torque or a threshold speed, for example, the control valve 316 may be adjusted to a closed valve position. When the control valve 316 is adjusted to a closed valve position, no combustion charge gas flows into the manifold 308 or turbine generator 332.

The turbine-generator 332 may include a protruding portion 422 with an internal slot that may be adequately sized to receive a mounting rod to secure the turbine wheel 418 to the interior region 416 of the turbine-generator, as disclosed further with reference to FIG. 5.

In this way, the manifold system 302 may include the manifold 308 configured with an internal passage that diverts combustion charge gas from the combustion chamber 320 into the turbine generator when both the control valve 316 is adjusted to the open valve position. By adjusting flow of combustion charge gas from the combustion chamber 320 into the manifold system 302, the engine compression ratio may be varied while producing electrical energy from a portion of combustion charge gas bled from each combustion chamber 320.

Referring to FIG. 5, a cross sectional view 500 of the manifold system 302 attached to the outer face 306 of the cylinder head 304 is disclosed. As shown in FIG. 5, a portion of the manifold system 302 includes the manifold 308, check valve/filter 326, gas sensor 328, igniter 330, and turbine-generator 332 coupled to the exhaust passage 342 which leads to the EGR system.

The manifold 308 may be mounted to the cylinder head 304 via the mounting pad 404 connected to the vertical column 402 of the manifold mounting boss 315. When mounted to the manifold mounting boss 315, the manifold 308 may be in face-sharing contact with the annular portion 405 of the mounting pad 404. The manifold 308 may be securely held in place by the mounting pad 404, thereby allowing a downstream end of the manifold system 302, including the turbine generator 332 to be supported by the manifold mounting boss 315. The manifold 308 may be an annular pipe adequately sized with an internal diameter 502 that allows for a wide flow range of combustion charge gas from the cylinder to the turbine generator 332. As an example, the internal diameter 502 of the manifold 308 may be selected to range from 19 mm to 21 mm. In another example, the manifold 308 may have a wall thickness 504 with a first range of 1.8 mm to 2.5 mm for a first position of the manifold 308 from the combustion chamber 320 to the check valve/filter 326, and a second range of 2.8 mm to 3.2 mm for a second portion of the manifold 308 from the check valve/filter 326 to the turbine generator 332. The manifold 308 may be comprised of a durable material such as ASTM A268 UNS S40900 or other suitable material that withstands high temperatures of the combustion charge gas bled from one or more combustion chambers.

A portion of the combustion charge gas in each engine cylinder may be diverted into the manifold system 302 via a control valve (such as control valve 316 shown in FIGS. 3-4) is adjusted to an open valve position. As an example, the control valve may be adjustable between a minimum angle and a maximum angle, wherein when adjusted to the minimum angle no flow or a low amount of charge gas flows from the combustion chamber into the manifold, and when adjusted to the maximum angle, a large amount of charge gas flows into the manifold. The check valve/filter 326, coupled to the manifold 308, may be provided to control flow of combustion charge gas from the manifold 308 to the turbine generator 332. The check valve/filter 326 may include an annular body 505 configured with an internal passage 506 having a sealing plate 508. As an example, the check valve/filter 326 may be configured as a valve and filter combination. The internal passage 506 may be sized with an internal diameter that adequately conveys flow of combustion charge gas from the manifold 308 into the turbine-generator 332. The sealing plate 508 may be adjusted via a controller (such as controller 12 shown in FIG. 1) to an open plate position, to allow flow of combustion charge gas from the manifold 308 into the turbine-generator 332 during engine operation. As an example, the sealing plate 508 may be adjusted to a partially or a fully open plate position, thereby allowing a wide flow range of combustion charge gas from the manifold 308 into the turbine-generator 332. In other examples, the sealing plate 508 may be adjusted by the controller to a closed plate position, to stop flow of combustion charge gas from the manifold 308 into the turbine-generator 332.

The gas sensor 328, positioned downstream of the check valve/filter 326, may be configured to detect any unburned fuel in the combustion charge gas prior to entry in the turbine-generator 332. As an example, the gas sensor 328 may include annular section 510 having an opening 512 sized to receive a sensor element 514 with a sensing tip 516.

In one example, the sensing element 514 may be positioned in the opening 512 such that a portion of the sensing element extends outward from the annular section 510, and the sensing tip 516 extends into an interior region of the manifold 308. The gas sensor 328 may sense unburned fuel in the combustion charge gas by measuring or estimating a hydrocarbon content of the charge gas, for example. The measured or estimated hydrocarbon content of the combustion charge gas may be compared to a threshold hydrocarbon level to determine an amount of unburned fuel in the charge gas. If the measured or estimated hydrocarbon content in the combustion charge gas exceeds the threshold hydrocarbon level, then the charge gas is deemed to contain unburned fuel. Alternatively, if the measured or estimated hydrocarbon content in the combustion charge gas is below the threshold hydrocarbon level, the charge gas may be considered free of unburned fuel. In alternative examples, the gas sensor 328 may sense the amount of unburned fuel in the combustion charge gas based on fuel properties other than the hydrocarbon content.

If unburned fuel is detected in the combustion charge gas, then the igniter 330 may be turned on by the controller to combust any unburned fuel, flowing downstream of the check valve/filter 326, before the charge gas enters the turbine-generator 332. The igniter 330 may include an annular section 518 having an opening 520 sized to receive an ignition rod 522. As an example, the ignition rod 522 may include an ignition tip 524 that extends into the interior region of the manifold 308. When turned on, the ignition tip 524 may be in contact with the combustion charge gas to provide an initial spark to ignite the fuel in the charge gas. In this way, the unburned fuel in the combustion charge gas may be combusted prior to entry into the turbine generator 332. By combusting any unburned fuel in the combustion charge gas, efficiency of the turbine-generator 332 may be improved while reducing fuel emissions.

The turbine generator 332 may include the wheel 418 mounted inside an internal opening 530 formed in the top portion 334. The turbine wheel 418 may be mounted to the turbine-generator 332 via a frame 532 having a shaft 534, a middle section 536 and a bottom section 538. The shaft 534 of the frame 532 may be secured in an aperture formed in the top portion 334 of the turbine-generator 332. A lower portion of the internal opening 530 may be closed off by a plate 540. As an example, the plate 540 may be a circular plate enclosing the lower portion of the internal opening 530. A portion of the manifold 308 may connect to a first portion of the plate 540 forming a first contact interface 542, and a portion of the exhaust passage 342 may connect to a second portion of the plate 540 forming a second contact interface 544. A slot 546, formed in a central section of the plate 540 may be adequately sized to receive a portion of the middle section 536 of the frame 532, which extends into the internal opening 530. When mounted to the top portion 334, the turbine wheel 526 may form a clearance 548 between a bottom end of the wheel 418 and internal surface 550 of the plate 540. As an example, the clearance 548 may be adequately sized to allow rotation of wheel 418 about an axis 552 of the turbine-generator 332. The combustion charge gas entering the turbine-generator 332 drives the wheel 418 to produce electrical power, which is transmitted to power demand centers of the engine or stored in a battery, as shown by direction arrow 340. The battery charge may be used to operate the vehicle or run a supercharger compressor coupled to an engine on the vehicle. An outer surface 554 of the bottom section 528 may be positioned below the plate 540, forming a clearance 556 between the bottom section 538 and plate 540. Once, the combustion charge gas is converted into electrical power, any residual exhaust gas in the turbine generator 332 is diverted to the exhaust passage 342, where the exhaust is delivered to the EGR system, as shown by arrow 344.

In this way, the manifold 308 may be provided to divert combustion charge gas from the cylinder into the turbine generator 332 when the control valve is adjusted to the open valve position. By adjusting flow of combustion charge gas from the cylinder, compression ratios in the engine may be varied based on engine operating conditions while producing electrical energy to operate engine components and vehicle systems.

Referring to FIG. 6, method 600 depicts an example method for controlling compression ratio in an engine having a control valve (e.g., control valve 316 shown in FIGS. 3-4) coupled to a cylinder and a manifold (e.g., manifold 308 shown in FIGS. 3-5) connected to a turbine-generator (e.g., turbine-generator 332 shown in FIGS. 3-5). The method may enable engine compression ratio to be adjusted to threshold levels that minimize occurrence of engine knock while promoting better engine performance.

Instructions for carrying out method 600 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below. The method of FIG. 6 may be used in conjunction with systems of FIGS. 1-5.

At 602, method 600 may include determining desired engine torque based on engine operating conditions. As an example, engine operating conditions may include but are not limited to engine speed, engine load, accelerator position, vehicle speed, engine temperature, knock propensity, and combustion charge mass flow.

Next, at 604, the method may include setting a control valve timing, spark timing, throttle position and boost pressure based on engine operating conditions and desired torque. For example, the control valve timing, spark timing, throttle position and boost pressure may be set based on engine load-speed and/or engine torque. In one example, the control valve coupled to each cylinder (e.g., control valve 316 coupled combustion chamber 320 shown in FIG. 4) may be adjusted to a closed valve position during high engine load and high engine speed. This may allow the engine to be operated at a higher compression ratio while producing adequate torque to meet the high engine load. In other examples, the control valve may be adjusted to an open valve position during low to moderate engine load-speed. In this case, a portion of combustion charge gas in one or more cylinders, may be bled into the manifold to vary the compression ratio. The charge gas in the manifold may be further flowed into a turbine-generator (e.g., turbine-generator 332 shown in FIGS. 3-5). In still another example, the control valve may be partially opened, a degree of opening of the valve adjusted to provide a sufficient margin to reduce occurrence of knock. For example, as a knock propensity of the cylinder increases, the degree of opening of the control valve may be increased. In response to an indication of knock, the control valve opening may be further adjusted (e.g., increased) so as to provide rapid knock relief.

Similarly, the spark timing, throttle position and boost pressure may be adjusted (based on engine load and speed) to vary the compression ratio. For example, at higher engine speeds and loads, spark timing may be slightly retarded from MBT while an intake throttle is held more open so as to slightly reduce the compression ratio and provide some knock relief. In still other examples, at high engine speed and load, a compression recirculation valve coupled across an intake compressor may be held partially open so as to provide some margin to surge. In response to a tip-out, when surge can occur, the compressor recirculation valve may be rapidly transitioned to a fully open position to reduce boost pressure and move the engine away from surge.

Upon determining settings for the control valve, spark timing, throttle position and boost pressure, the method 600 may proceed to 606. At 606, the method 600 may include determining if engine knock is present. Engine knock may occur when a temperature and pressure of air-fuel mixture in an engine cylinder exceeds a threshold level and causes the mixture to auto ignite. This may produce a shock wave that may generate a rapid increase in cylinder temperature and pressure which may cause damage to engine components. The presence of engine knock may be determined by a knock sensor mounted to the engine to measure engine vibration, for example.

If engine knock is detected, the method may proceed to 608. At 608, the method 600 may include adjusting the control valve timing or spark timing or both control valve timing and spark timing to control the compression ratio and mitigate knock. By adjusting the control valve or spark timing, the compression ratio may be decreased to reduce cylinder temperature and pressure.

As such, knock may be mitigated by retarding spark timing. However, spark retard usage results in a fuel penalty. Knock may also be mitigated by reducing the compression ratio of the knocking cylinder by increasing an opening of the control valve. While this results in a drop in torque and engine performance, at least a portion the engine work dissipated via the opening of the control valve may be recovered via operation of the turbine-generator coupled downstream of the control valve. In response to an indication of knock, the controller may compare the fuel penalty associated with spark retard usage to the engine performance loss associated with control valve opening (taking into account engine performance recovered via the electric turbine) and select a knock mitigating action accordingly. For example, when the fuel penalty associated with spark retard usage is lower, spark timing may be retarded from MBT to mitigate knock. In comparison, when the engine performance loss associated with control valve opening is lower, the control valve may be moved to a more open position (from its current position) while maintaining spark timing at MBT.

In one example, where control valve adjustment is selected for knock mitigation, the control valve may be moved from the partially open position to a more open (e.g., fully open) valve position responsive to knock to allow the combustion charge in the cylinder to rapidly flow into the manifold. Spark timing may be held at or around MBT while increasing the opening of the control valve. A duration of control valve opening as well as a degree of valve opening may be adjusted based on engine operating conditions and desired reduction in cylinder temperature and pressure that provides the required knock relief. As a result, the engine compression ratio may decrease to a threshold value leading to a reduction in cylinder temperature and pressure to minimize undesirable effects of engine knock. The combustion charge in the manifold may be flowed downstream to the turbine-generator, where the charge gas drives a turbine wheel to generate electric power which is distributed to power demand centers in the engine or vehicle. For example, the control valve may be opened more, or held open longer, until the indication of knock received from a knock sensor subsides (and for a duration thereafter). Then the control valve may be returned to the less open position and the cylinder compression ratio may be returned to the higher value that provides higher engine efficiency.

Boost pressure adjustments may also be concurrently performed. For example, responsive to the indication of knock, while the control valve is opened to reduce cylinder temperature and pressure, drop in boost pressure may be compensated for by increasing a throttle opening, reducing the opening of a compressor recirculation valve, and/or decreasing the opening of an exhaust waste-gate valve.

In an alternative embodiment, the spark timing may be adjusted by retarding spark ignition to reduce the compression ratio. A decrease in the compression ratio may lead to a reduction in cylinder temperature and pressure, thereby minimizing the effects of engine knock on engine performance. After adjusting the control valve timing and/or spark timing, the method 600 may proceed to 610.

Returning to 606, if engine knock is not detected, the method may proceed to 610. At 610, the method 600 may include determining if a fast torque transient is present. Fast torque transients may include a sudden increase in torque, or a sudden decrease in torque. For example, a fast torque transient may occur when a vehicle is brought to a halt responsive to a tip-out of an accelerator pedal or operator application of a brake pedal. A fast torque transient may alternatively occur when the vehicle accelerates after a stop, for example, during vehicle launch or responsive to a tip-in of an accelerator pedal. If a fast torque transient is present, method 600 proceeds to 612. Otherwise the method proceeds to 614 to resume nominal engine operation if the fast torque transient is not present. For example, when a torque transient is not present, spark timing may be returned to MBT (if it was previously retarded), and further the control valve may be returned to a nominal position based on the engine's knock propensity. For example, the control valve may be returned to a partially open position.

At 612, method 600 may include coordinating change in control valve timing, throttle position and boost pressure for a threshold duration responsive to the presence of a torque transient. The engine controller may make adjustments in control valve timing, throttle position and boost pressure for a duration that allows the actual engine torque to match desired engine torque. For example, responsive to a transient demand for negative torque, such as when a driver applies the brake pedal or tips out of an accelerator pedal, the controller may reduce the opening of the control valve (e.g., close the control valve) and adjust the throttle to a more closed position to reduce engine torque to allow the vehicle to stop. In an alternative example, when the driver applies the accelerator pedal to launch the vehicle, the controller may keep the control valve temporarily closed and adjust the throttle to an open position to increase engine torque, thereby allowing the vehicle to accelerate. Once the vehicle attains a threshold speed, the controller may adjust the control valve to a more open valve position to allow combustion charge from the engine cylinder to flow to the manifold coupled to the turbine-generator, thereby modulating the engine compression ratio while maintaining the actual engine torque at values close to the desired engine torque.

Next at 614, the engine resumes nominal operation, where the engine continues to combust air and fuel to produce torque needed to propel the vehicle. The control valve in each cylinder of the engine may be periodically adjusted to open and then close during engine operation. When the control valve is adjusted to the open valve position, combustion charge gas from the cylinder may flow into the manifold. A check valve (e.g., check valve/filter 326 shown in FIGS. 3-5) on the manifold to stops reverse flow of the combustion charge gas back into the combustion chamber. The check valve always allows combustion charge gas flow downstream into the turbine-generator 332. A gas sensor (e.g., gas sensor 328 shown in FIGS. 3-5) coupled to the manifold 308, may be provided to detect any unburned fuel in the combustion charge gas, which may be combusted by an igniter (e.g., igniter 330 shown in FIGS. 3-5) prior to entry into the turbine-generator. Upon entry into the turbine-generator, the combustion charge gas drives a turbine wheel (e.g., turbine wheel 418 shown in FIGS. 4-5) to generate electric power which is distributed to power demands centers in the engine or vehicle. Any residual exhaust gas generated after the electrical power is produced is diverted to an EGR system, where the exhaust may be recirculated to an intake manifold.

In this way, the compression ratio in the engine may be varied by adjusting the control valve timing, throttle position and spark timing. The control valve may be adjusted to the open valve position to mitigate engine knock, and alleviate effects of high cylinder temperature and pressure which may occur during high compression ratios. When adjusted to the open valve position, combustion charge gas may be diverted from engine cylinders to the manifold, thereby allowing for a reduction in compression ratio and a decrease in cylinder temperature and pressure. The charge gas in the manifold may be diverted to the turbine-generator to produce electrical power. In this way, the engine system provides for a method of varying engine compression ratio to promote better engine performance while producing electrical power to operate engine components.

Referring now to FIG. 7, an example graphic depicting adjusting of a control valve timing, throttle position and spark timing to vary compression ratio and torque in an engine is shown. The sequence of FIG. 7 may be provided by executing instructions in the system of FIGS. 1-5 according to the methods of FIG. 6. Vertical markers at times T0-T3 represent time of interest during the sequence. In all the plots discussed below, the horizontal axis represents time and time increases from the left side of each plot to the right side of each plot.

The first plot from top of FIG. 7 depicts compression ratio versus time. The vertical axis represents compression ratio in an engine and the compression ratio increases in the direction of the vertical axis. Trace 702 represents the compression ratio.

The second plot from top of FIG. 7 depicts a control valve position versus time. The vertical axis represents the control valve position. The control valve is adjusted to a closed valve position at the horizontal axis, and adjusted to an open valve position in the direction of the vertical axis. A degree of valve opening of the control valve increases in the direction of the vertical axis. Trace 704 represents the control valve position. In alternative embodiments, the control valve may be referred to as a bleed valve.

The third plot from top of FIG. 7 depicts a throttle valve position versus time. The vertical axis represents the throttle valve position. The throttle valve is adjusted to a closed valve position at the horizontal axis, and adjusted to an open valve position in the direction of the vertical axis. A degree of valve opening of the throttle valve increases in the direction of the vertical axis. Trace 706 represents the throttle position.

The fourth plot from top of FIG. 7 depicts engine torque versus time. The vertical axis represents engine torque and the engine torque increases in the direction of the vertical axis. Trace 708 represents a desired engine torque and trace 710 represents an actual engine torque.

The fifth plot from top of FIG. 7 depicts spark timing versus time. The vertical axis represents spark timing and the spark timing increases in the direction of the vertical axis. Trace 716 represents an actual spark timing and trace 718 represents a spark timing for maximum braking torque (MBT).

At time between T0 and T1, the engine may be operating with a steady compression ratio (702), below a threshold level (703) of the compression ratio. For example, the compression ratio (702) may be set at a first level lower than the threshold level (703). The actual engine torque (710) may be at a steady level, and may be equal to the desired engine torque (708). The control valve position (704) may be kept at a first open valve position that maintains the actual engine torque (710) at the steady level equal to the desired engine torque (708). For example, the control valve position (704) may be adjustable between an angle of 0 degrees and 60 degrees. When set at the 0 degree angle, the control valve is adjusted to a closed valve position, and when set at the 60 degree angle, the control valve is adjusted to a more open valve position. In other examples, the control valve position (704) may be adjustable between a minimum angle and a maximum angle, where the minimum angle allows for no flow or a minimum flow rate of charge gas from a cylinder into a manifold (e.g., manifold 308 shown in FIG. 3), and the maximum angle allows for a maximum flow rate of charge gas from the cylinder into the manifold.

Further, the throttle position (706) may be maintained at an open position that allows a steady flow of air into the intake manifold, where the air is flowed downstream to a combustion chamber where the air mixes with fuel to form an air-fuel mixture which combusts to produce engine torque (710). The spark timing (716) may be set at the spark timing for MBT (718).

When the control valve is adjusted to the open valve position, combustion charge in the combustion chamber may be diverted from the chamber into the manifold (e.g., manifold 308 shown in FIG. 3) while maintaining the compression ratio (702) at the steady level below the threshold level (703). The combustion charge gas in the manifold may be flowed downstream to a turbine-generator (e.g., turbine-generator 332 shown in FIGS. 3-5) when a check valve (e.g., check valve/filter 326 shown in FIGS. 3-5) coupled to the manifold is adjusted to an open valve position. Upon entry into the turbine-generator, the combustion charge gas turns a turbine wheel (e.g., turbine wheel 418 shown in FIGS. 4-5) of the turbine-generator to produce electrical power which may be distributed to power demand centers in the engine or vehicle.

At T1, the compression ratio (702) may be increased above the threshold level (703) to increase the actual engine torque (710) in the engine. As an example, the compression ratio (702) may increase from the first level to a second level higher than the threshold level (703). In one example, the increase in compression ratio (702) may occur when a flow rate of the combustion charge gas (flowing from the combustion chamber into the manifold) is decreased, and the throttle position (706) is adjusted to a more open valve position, thereby allowing a larger flow of air into the combustion chamber via the intake manifold. The control valve position (704) may be adjusted from the open position to a fully closed position, to stop flow of combustion charge gas from the combustion chamber into the manifold.

Between T1 and T2, the compression ratio (702) may be maintained at the second level above the threshold level (703). The control valve (704) may be kept in the closed valve position and the throttle position (706) may be maintained at a level higher the initial throttle position before T1. Consequently, the actual engine torque (710), may initially increase rapidly before attaining a steady level higher than the initial torque observed between T0 and T1. The actual engine torque (710) may slightly depart from than the desired engine torque (708) profile. A first torque increase 712 may be attributed to the closing of the control valve, and a second torque increase 714 may be attributed to the adjustment in the throttle position. The first torque increase 712 may be larger than the second torque increase 714. Closing the control valve to stop flow of combustion charge gas from the combustion chamber into the manifold, may have an immediate impact of increasing compression ratio (702), which may lead to a rapid increase in the actual engine torque (710). In contrast, adjusting the throttle position (706) to allow for a larger flow of air into the combustion chamber via the intake manifold may occur over a long duration due to increased travel time of air through the intake manifold before the air reaches the combustion chamber. The increased mass of air flowing into the combustion chamber may mix with fuel to form an air-fuel which is combusted to produce a large amount of engine torque (710). However, the increase in the actual engine torque due to adjusting the throttle position may be lower compared to the increase in actual engine torque based on closing the control valve. The spark timing (716) may be gradually retarded to a level below the MBT level (718) while maintaining the actual engine torque (710) at a steady level close to the desired engine torque (708).

At T2, the compression ratio (702) may decrease to a level below the threshold level (703) when the control valve is adjusted from the fully closed valve position to an open valve position. As an example, the compression ratio (702) may decrease from the second level to the first level, when the control valve is adjusted to a second open valve position with a smaller degree of valve opening compared to the first valve opening observed prior to T1. In other examples, the varying of the compression ratio may be conducted in response to an indication of knock, the indication of knock including one of detected knock and anticipated knock, the varying including decreasing the compression ratio responsive to the indication of knock by increasing an opening of the bleed valve. In further examples, one or more of a degree of opening of the bleed valve and a duration of opening of the bleed valve may be adjusted based on the indication of knock, the bleed valve held more open or opened for a longer duration until the indication of knock is below a threshold. The spark timing (716) may be adjusted to match the spark MBT level (718). As a result, the actual engine torque (710) may be maintained at values close to the desired engine torque (708).

After T2, the compression ratio (702) may be maintained at the first level by keeping the control valve position (704) at the second valve open position and gradually adjusting the throttle position (706) to a less open position to reduce air flow into combustion chamber (via the intake manifold). The air flow rate into the combustion chamber may be lower compared to the air flow rate observed between T1 and T2, for example. Further, the spark timing (716) may be maintained at the spark MBT level (718). Consequently, the compression ratio (702) is maintained at the second steady level, and the actual engine torque (710) may match the desired engine torque (708).

In this way, the compression ratio in the engine may be varied by adjusting the control valve timing, throttle position and spark timing to maintain the actual engine torque close to the desired engine torque. The combustion charge gas bled from the combustion chamber when the control valve and check valve on the manifold are adjusted to open valve positions, may flow into the turbine-generator, where the charge gas turns the turbine wheel to produce electrical power. In this way, the compression ratio in the engine may be varied to allow for better engine performance while producing electrical power which may be distributed power demand centers in the engine.

In a further representation, a method for an engine includes: responsive to a first indication of knock in a cylinder, retarding spark timing while maintaining a compression ratio of the cylinder by closing a bleed valve coupled to a cylinder head, distinct from an exhaust valve; and responsive to a second indication of knock, maintaining spark timing while decreasing the compression ratio of the knocking cylinder by opening the bleed valve. In a preceding example, additionally or optionally, the bleed valve is coupled upstream of a turbine generator, and wherein decreasing the compression ratio by opening the bleed valve includes releasing at least a portion of charge gas from the cylinder, flowing the released charge gas through the turbine generator, and generating usable electrical power at the turbine generator via the flowing. Any of the preceding examples, additionally or optionally, may include responsive to both the first and the second indication of knock, estimating each of a first fuel penalty associated with retarding spark timing while maintaining a compression ratio of the knocking cylinder by closing the bleed valve coupled and a second performance penalty associated with maintaining the spark timing while decreasing the compression ratio of the cylinder by opening the bleed valve and flowing released charge gas through a downstream turbine generator.

Furthermore, in any of the preceding examples, additionally or optionally, the second performance penalty is further estimated based on electrical power generated via flowing the released charge gas through the turbine generator. Any of the preceding examples, may additionally or optionally include, during the first indication of knock, the first fuel penalty is smaller than the second performance penalty, and wherein during the second indication of knock, the second performance penalty is smaller than the first fuel penalty. In any of the preceding examples, additionally or optionally, the first and second indication of knock include a common knock intensity. In any of the preceding examples, additionally or optionally, the first indication of knock includes a lower knock intensity and the second indication of knock includes a higher knock intensity. Further examples may include, responsive to the first indication of knock, reducing an opening of an EGR valve to reduce recirculation of exhaust gas from an exhaust manifold to an intake manifold; and responsive to the second indication of knock, increasing an opening of the EGR valve to increase recirculation of exhaust gas from the bypass manifold, downstream of the turbine generator, to the intake manifold.

In one example, an engine may comprise: varying a compression ratio of a cylinder by selectively releasing combustion charge gas from the cylinder through a bleed valve on a cylinder head; and transforming the released combustion charge gas into usable electrical power at a turbine generator coupled downstream of the bleed valve. In the preceding example, additionally or optionally, the bleed valve is distinct from an exhaust valve of the cylinder. In any or all of the preceding examples, additionally or optionally, the transforming includes igniting, via an igniter, unburned fuels in the released combustion charge upstream of the turbine generator, an output of the igniter adjusted based on a detected amount of the unburned fuels in the released combustion charge.

In other preceding examples, additionally or optionally, the transforming the released combustion charge into usable electrical power includes storing the usable electrical power in a battery coupled to the turbine generator. In any or all of the preceding examples, additionally or optionally, the engine is coupled in a hybrid vehicle, the method further comprising, propelling the vehicle using motor torque derived from an electrical motor driven by electrical power drawn from the battery. In any of the preceding examples, additionally or optionally, the varying the compression ratio is responsive to an indication of knock, the indication of knock including one of detected knock and anticipated knock, the varying including decreasing the compression ratio responsive to the indication of knock by increasing an opening of the bleed valve. In any or all of the preceding examples, additionally or optionally, one or more of a degree of opening of the bleed valve and a duration of opening of the bleed valve is adjusted based on the indication of knock, the bleed valve held more open or opened for a longer duration until the indication of knock is below a threshold.

Any or all of the preceding examples, may additionally or optionally, further comprise: after the transforming, recirculating the released combustion charge from downstream of the turbine generator to an engine intake via an exhaust gas recirculation passage. In any or all of the preceding examples, additionally or optionally, varying the compression ratio includes: increasing the compression ratio by closing the bleed valve to retain combustion charge in the cylinder; and decreasing the compression ratio by opening the bleed valve to release combustion charge from the cylinder. Any or all of the preceding examples, may additionally or optionally, further comprise: maintaining a boosted manifold pressure while varying the compression ratio, the maintaining including: responsive to opening the bleed valve, one or more of increasing an intake throttle opening, reducing a compressor recirculation valve opening, and decreasing an opening of an exhaust waste-gate valve; and responsive to closing the bleed valve, one or more of decreasing the intake throttle opening, increasing the compressor recirculation valve opening, and increasing the opening of the exhaust waste-gate valve. In any or all of the preceding examples, additionally or optionally, the varying is responsive to a transient change in operator torque demand, the transient change including one of a transient increase in operator torque demand to launch a vehicle, and a transient decrease in torque demand to decelerate the vehicle, the varying including: responsive to the transient increase in operator torque demand, closing the bleed valve to decrease the compression ratio while increasing an intake throttle opening; and responsive to the transient decrease in operator torque demand, opening the bleed valve to increase the compression ratio while decreasing the intake throttle opening.

Another method may comprise: responsive to an indication of knock, comparing a first fuel penalty associated with retarding spark timing while maintaining a compression ratio of a knocking cylinder by closing a bleed valve coupled to a cylinder head, distinct from an exhaust valve, to a second performance penalty associated with maintaining spark timing while decreasing the compression ratio of the cylinder by opening the bleed valve and flowing released charge gas through a downstream turbine generator; and opening the bleed valve when the second performance penalty is lower than the first fuel penalty. In any or all of the preceding examples, additionally or optionally, the second performance penalty is calculated as a function of a loss in cylinder pressure from release of charge gas via the open bleed valve, and a gain in battery state of charge from electrical power generated via flowing of the released charge gas through the turbine generator. In any or all of the preceding examples, additionally or optionally, the indication of knock includes an output of a knock sensor being higher than a threshold, and wherein opening the bleed valve includes adjusting a duration and a degree of opening the bleed valve until the output of the knock sensor is lower than the threshold. In any or all of the preceding examples, additionally or optionally, may further comprise: closing the bleed valve and retarding spark timing when the first fuel penalty is lower than the second performance penalty.

In a further example, an engine system may comprise: an engine cylinder having an intake valve receiving air from an intake manifold and an exhaust valve releasing charge into an exhaust manifold; an EGR passage for recirculating exhaust gas from the exhaust manifold to the intake manifold; a cylinder head including a bleed valve leading to a bypass manifold, the bypass manifold including an igniter coupled upstream of a turbine generator, the bypass manifold coupled to the EGR passage, downstream of the turbine generator; a battery coupled to the turbine generator; a knock sensor coupled to the cylinder head; an oxygen sensor coupled to the bypass manifold, upstream of the igniter; and a controller with computer readable instructions stored on non-transitory memory for: operating the cylinder at a higher compression ratio by decreasing an opening of the bleed valve; operating the cylinder at a lower compression ratio by increasing the opening of the bleed valve; and while operating at the lower compression ratio, flowing charge released from the cylinder through the turbine generator; and charging the battery with electric power generated at the turbine generator via the flowing.

Any or all of the preceding examples, may additionally or optionally, further comprise: while operating at the lower compression ratio, recirculating the exhaust gas released from the cylinder to the intake manifold, via the EGR passage, after flowing through the turbine generator.

In other preceding examples, additionally or optionally, the operating at the lower compression ratio is responsive to knock sensor output being higher than a threshold, the opening of the bleed valve increased by an amount, and held open for a duration, until the knock sensor output drops below the threshold. Other preceding examples, may additionally or optionally, further comprise: an accelerator pedal for receiving an operator torque demand, wherein the operating at the lower compression ratio is responsive to a transient drop in operator torque demand, and wherein the operating at the higher compression ratio is responsive to a transient rise in operator torque demand.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
varying, via a controller, a compression ratio of a cylinder by selectively releasing combustion charge from an air-fuel mixture ignited in the cylinder through a bleed valve on a cylinder head;
flowing the released combustion charge through a turbine generator coupled downstream of the bleed valve; and
generating usable electrical power at the turbine generator via the flowing.

2. The method of claim 1, wherein the bleed valve is distinct from an exhaust valve of the cylinder.

3. The method of claim 1, wherein the generating includes igniting, via an igniter, unburned fuels in the released combustion charge upstream of the turbine generator, an output of the igniter adjusted based on a detected amount of the unburned fuels in the released combustion charge.

4. The method of claim 1, wherein the generating includes storing the usable electrical power in a battery coupled to the turbine generator.

5. The method of claim 4, wherein the engine is coupled in a hybrid vehicle, the method further comprising propelling the vehicle using motor torque derived from an electrical motor driven by electrical power drawn from the battery.

6. The method of claim 1, wherein the varying the compression ratio is responsive to an indication of knock, the indication of knock including one of detected knock and anticipated knock, the varying including decreasing the compression ratio responsive to the indication of knock by increasing an opening of the bleed valve.

7. The method of claim 6, wherein one or more of a degree of opening of the bleed valve and a duration of opening of the bleed valve is adjusted based on the indication of knock, the bleed valve held more open or opened for a longer duration until the indication of knock is below a threshold.

8. The method of claim 1, further comprising, after the generating, recirculating the released combustion charge from downstream of the turbine generator to an engine intake via an exhaust gas recirculation passage.

9. The method of claim 1, wherein varying the compression ratio includes:
increasing the compression ratio by closing the bleed valve to retain combustion charge in the cylinder; and
decreasing the compression ratio by opening the bleed valve to release combustion charge from the cylinder.

10. The method of claim 9, further comprising maintaining a boosted manifold pressure while varying the compression ratio, the maintaining including:
responsive to opening the bleed valve, one or more of increasing an intake throttle opening, reducing a compressor recirculation valve opening, and decreasing an opening of an exhaust waste-gate valve; and
responsive to closing the bleed valve, one or more of decreasing the intake throttle opening, increasing the compressor recirculation valve opening, and increasing the opening of the exhaust waste-gate valve.

11. The method of claim 1, wherein the varying is responsive to a transient change in operator torque demand, the transient change including one of a transient increase in operator torque demand to launch a vehicle, and a transient decrease in operator torque demand to decelerate the vehicle, the varying including:
responsive to the transient increase in operator torque demand, closing the bleed valve to decrease the compression ratio while increasing an intake throttle opening; and
responsive to the transient decrease in operator torque demand, opening the bleed valve to increase the compression ratio while decreasing the intake throttle opening.

12. A method, comprising:
responsive to an indication of knock including a higher than threshold output of a knock sensor,
comparing, via a controller, a first engine performance penalty associated with retarding spark timing while maintaining a compression ratio of a knocking cylinder by closing a bleed valve coupled to a cylinder head, distinct from an exhaust valve, to a second engine performance penalty associated with maintaining spark timing while decreasing the compression ratio of the knocking cylinder by opening the bleed valve and flowing released exhaust gas through a downstream turbine generator; and
opening, via the controller, the bleed valve when the second engine performance penalty is lower than the first engine performance penalty.

13. The method of claim 12, wherein the second engine performance penalty is calculated as a function of a loss in cylinder pressure from release of charge gas via the open bleed valve, and a gain in battery state of charge from electrical power generated via flowing of the released exhaust gas through the turbine generator.

14. The method of claim 12, wherein opening the bleed valve includes adjusting a duration and a degree of opening the bleed valve until the output of the knock sensor is lower than the threshold.

15. The method of claim 12, further comprising closing the bleed valve and retarding spark timing when the first engine performance penalty is lower than the second engine performance penalty.

16. An engine system, comprising:
an engine cylinder having an intake valve receiving air from an intake manifold and an exhaust valve releasing charge into an exhaust manifold;
an exhaust gas recirculation (EGR) passage for recirculating exhaust gas from the exhaust manifold to the intake manifold;
a cylinder head including a bleed valve leading to a bypass manifold, the bypass manifold including an igniter coupled upstream of a turbine generator, the bypass manifold coupled to the EGR passage, downstream of the turbine generator;
a battery coupled to the turbine generator;
a knock sensor coupled to the cylinder head;
an oxygen sensor coupled to the bypass manifold, upstream of the igniter; and
a controller with computer readable instructions stored on non-transitory memory for:
operating the cylinder at a higher compression ratio by decreasing an opening of the bleed valve;
operating the cylinder at a lower compression ratio by increasing the opening of the bleed valve; and while operating at the lower compression ratio, flowing exhaust released from the cylinder through the turbine generator; and charging the battery with electric power generated at the turbine generator via the flowing.

17. The system of claim 16, further comprising, while operating at the lower compression ratio, sensing, via the oxygen sensor, an amount of unburned fuel in the exhaust released from the cylinder, and adjusting an output of the igniter based on the sensed amount of unburned fuel.

18. The system of claim 16, further comprising, while operating at the lower compression ratio, recirculating the exhaust released from the cylinder to the intake manifold, via the EGR passage, after flowing through the turbine generator.

19. The system of claim 16, wherein the operating at the lower compression ratio is responsive to knock sensor output being higher than a threshold, the opening of the bleed valve increased by an amount, and held open for a duration, until the knock sensor output drops below the threshold.

20. The system of claim 16, further comprising an accelerator pedal for receiving an operator torque demand, wherein the operating at the lower compression ratio is responsive to a transient drop in operator torque demand, and wherein the operating at the higher compression ratio is responsive to a transient rise in operator torque demand.

* * * * *